(12) United States Patent
Wang et al.

(10) Patent No.: US 10,911,884 B2
(45) Date of Patent: Feb. 2, 2021

(54) DATA PROCESSING METHOD AND APPARATUS, ACQUISITION DEVICE, AND STORAGE MEDIUM

(71) Applicant: ZTE CORPORATION, Guangdong (CN)

(72) Inventors: Liang Wang, Shenzhen (CN); Xiaoyang Ye, Shenzhen (CN); Cheng Huang, Shenzhen (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/474,133

(22) PCT Filed: Dec. 26, 2017

(86) PCT No.: PCT/CN2017/118600
§ 371 (c)(1),
(2) Date: Jun. 27, 2019

(87) PCT Pub. No.: WO2018/121524
PCT Pub. Date: Jul. 5, 2018

(65) Prior Publication Data
US 2019/0387347 A1 Dec. 19, 2019

(30) Foreign Application Priority Data
Dec. 30, 2016 (CN) .......................... 2016 1 1265760

(51) Int. Cl.
*H04S 7/00* (2006.01)
*G10L 19/008* (2013.01)
(Continued)

(52) U.S. Cl.
CPC .............. *H04S 7/303* (2013.01); *H04S 5/005* (2013.01); *H04S 7/301* (2013.01); *H04S 7/307* (2013.01);
(Continued)

(58) Field of Classification Search
CPC ... H04S 7/00; H04S 7/30; H04S 7/301; H04S 7/302; H04S 7/303; H04S 7/307;
(Continued)

(56) References Cited

U.S. PATENT DOCUMENTS 5,714,997 A * 2/1998 Anderson ............ G02B 27/017
348/39
2005/0243168 A1* 11/2005 Cutler .................... H04N 7/147
348/14.12
(Continued)

FOREIGN PATENT DOCUMENTS

CN 101350931 A 1/2009
CN 205039929 U 2/2016
(Continued)

OTHER PUBLICATIONS

International Search Report and the English Translation of PCT Application No. PCT/CN2017/118600 dated Mar. 19, 2018, 5 pages.
(Continued)

*Primary Examiner* — Thang V Tran
(74) *Attorney, Agent, or Firm* — Cooper Legal Group, LLC

(57) ABSTRACT

Disclosed is a data processing method, comprising: acquiring space information of audio acquisition devices of an acquisition device, an acquisition space corresponding to the acquisition device being formed into a geometry, the spatial orientation deployed by video acquisition devices of the acquisition device covering the entire geometry, and the setting orientation of each video acquisition device being correspondingly provided with N audio acquisition devices, wherein N is a positive integer; regarding the N audio acquisition devices provided corresponding to the setting orientation of each video acquisition device, encoding audio data acquired by the N audio acquisition devices according
(Continued)

```
┌─────────────────────────────────────────────────┐
│ Acquire space information of audio acquisition  │      101
│ devices of an acquisition device                │ ────
└─────────────────────────────────────────────────┘
                        │
                        ▼
┌─────────────────────────────────────────────────┐
│ Encode audio data acquired by N audio           │      102
│ acquisition devices according to the space      │ ────
│ information of the audio acquisition devices    │
│ to form M channels of audio data                │
└─────────────────────────────────────────────────┘
``` to the space information of the audio acquisition devices, to form M pieces of audio data, the M pieces of audio data carrying space information of audios. Embodiments of the present invention further provide an acquisition device, a data processing device, and a storage medium.

7 Claims, 23 Drawing Sheets

(51) Int. Cl.
*H04S 5/00* (2006.01)
*H04N 13/10* (2018.01)
(52) U.S. Cl.
CPC ............ *G10L 19/008* (2013.01); *H04N 13/10* (2018.05); *H04S 2420/01* (2013.01)
(58) Field of Classification Search
CPC ............ H04S 2400/01; H04S 2400/11; H04S 2400/15; H04S 2420/01; H04S 2420/03; H04S 5/005; G10L 19/00; G10L 19/008; H04R 3/00; H04R 3/312; H04R 5/00; H04R 5/04; H04N 13/00; H04N 13/10; H04N 13/106; H04N 13/20; H04N 13/204; H04N 13/243
See application file for complete search history.

(56) References Cited

U.S. PATENT DOCUMENTS

| | | | | |
|---|---|---|---|---|
| 2009/0094375 | A1* | 4/2009 | Lection | .................... G06F 15/16 709/231 |
| 2010/0098258 | A1 | 4/2010 | Thorn | |
| 2011/0164769 | A1* | 7/2011 | Zhan | ...................... H04N 7/147 381/307 |
| 2012/0206565 | A1* | 8/2012 | Villmer | .............. H04N 5/23258 348/36 |
| 2013/0093837 | A1* | 4/2013 | Yue | ......................... H04N 7/152 348/14.08 |
| 2015/0149943 | A1 | 5/2015 | Nguyen et al. | |
| 2016/0021478 | A1* | 1/2016 | Katagiri | ................. H04R 5/027 381/26 |
| 2016/0133261 | A1* | 5/2016 | Shi | ........................ G10L 19/008 381/22 |
| 2017/0236149 | A1* | 8/2017 | Christensen | ....... G06Q 30/0269 345/156 |
| 2018/0098174 | A1* | 4/2018 | Goodwin | ................ H04S 7/303 |
| 2018/0160251 | A1* | 6/2018 | Sanger | .................... H04S 7/303 |
| 2018/0310049 | A1* | 10/2018 | Takahashi | .............. H04R 1/326 |
| 2019/0222798 | A1* | 7/2019 | Honma | ................ G06K 9/0057 |

FOREIGN PATENT DOCUMENTS

| | | |
|---|---|---|
| CN | 105761721 A | 7/2016 |
| CN | 106020441 A | 10/2016 |
| CN | 106162206 A | 11/2016 |
| CN | 106774930 A | 5/2017 |
| WO | 94/16406 A1 | 7/1994 |
| WO | 2016/123572 A1 | 8/2016 |

OTHER PUBLICATIONS

Written Opinion and the English Translation of PCT Application No. PCT/CN2017/118600 dated Mar. 19, 2018, 9 pages.

* cited by examiner

DATA PROCESSING METHOD AND APPARATUS, ACQUISITION DEVICE, AND STORAGE MEDIUM

CROSS-REFERENCE TO RELATED APPLICATION

The present application is based on and claims priority to Chinese Patent Application No. 201611265760.0, filed on Dec. 30, 2016. The disclosures of the Chinese Patent Application are hereby incorporated by reference in their entireties.

TECHNICAL FIELD

The disclosure relates to a Virtual Reality (VR) technology, and in particular to a data processing method and device, an acquisition apparatus, and a storage medium.

BACKGROUND

The VR technology, as an important direction of the simulation technology, is a challenging frontal subject and research field of cross technologies. The VR technology is mainly a computer-simulated environment which is highly realistic in visual sense, auditory sense, tactile sense, sense of smell, sense of taste, and other aspects. Specifically, the VR technology is using computer technologies to generate a three-dimensional virtual world by simulation, such that a user may immediately perceive things in virtual space without idle time. The VR technology is a comprehensive technology of multiple subjects, including: a computer graphics technology, a multimedia technology, a sensor technology, a human-computer interaction technology, a network technology, a stereoscopic imaging technology and a computer simulation technology.

At present, fewer microphones are provided in a VR audio acquisition device, omnidirectional audio acquisition is not really realized, that is, the range of acquisition does not achieve 360 degrees in longitude and latitude directions; besides, there is no space information of an audio in the process of storage and transmission, then at the time of rendering, only video data is mainly considered, therefore simple artificial post production is needed to perform coordinate rendering to spatial positions of audios and videos currently acquired through the VR technology. However, the coordinate rendering cannot achieve the effect of real synchronization.

SUMMARY

The disclosure provides a data processing method and device, an acquisition apparatus, and a storage medium.

A technical solution of the disclosure is implemented as follows.

Embodiments of the disclosure provide a data processing method. The method includes the following operations.

Space information of audio acquisition devices of an acquisition apparatus is acquired. An acquisition space corresponding to the acquisition apparatus forms a geometry. Spatial positions, at which video acquisition devices of the acquisition apparatus are deployed, cover the whole geometry. N audio acquisition devices are provided at a deployed position of each of the video acquisition devices, where N is a positive integer.

For the N audio acquisition devices provided at the deployed position of each of the video acquisition devices, audio data acquired by the N audio acquisition devices is encoded according to the space information of the audio acquisition devices to form M channels of audio data. The M channels of audio data carry space information of an audio, where M is a positive integer.

In the above solution, the space information of the audio carried in the M channels of audio data is at least one of the followings: physical space information or sound pick-up space information of the N audio acquisition devices, space information of a central point of spatial positions of the N audio acquisition devices and space information of a central point of a captured video.

In the above solution, the space information of the audio carried in the M channels of audio data is in a form of: position information in a map in longitude and latitude, three-dimensional Cartesian coordinates in a three-dimensional coordinate system, spherical coordinates in a spherical coordinate system and orientation information relative to an opposite surface.

In the above solution, at least one of following applies.

The video data acquired by all the video acquisition devices can be restored to a sphere.

The audio data acquired by all the audio acquisition devices can be restored to a sphere.

In the above solution, the method further includes the following operation.

The M channels of audio data are stored or sent out.

The embodiments of the disclosure further provide a data processing method. The method includes the following operations.

M channels of encoded audio data are received.

The M channels of encoded audio data are decoded to acquire space information of an audio corresponding to the M channels of audio data, where M is a positive integer.

Q speaker devices corresponding to the M channels of audio data are determined according to the acquired space information of the audio and position information of the speaker devices, where Q is a positive integer.

The M channels of audio data are rendered with the determined Q speaker devices.

In the above solution, the method further includes the following operations.

According to a moving posture of a user, orientation information of a viewpoint (VP) and/or a region of interest (ROI) on a projection mapping volume is acquired.

The audio data rendered by each of the speaker devices is adjusted according to the position information of the Q speaker devices and the space information of the audio.

In the above solution, the operation of rendering the M channels of audio data with the determined Q speaker devices includes at least one of the following operations.

At least two channels of audio data in a preset radius range around the position of the speaker device are mixed, and then the mixed audio data is rendered.

It is determined that the speaker devices, of which positions are consistent with vectors of the audio acquisition devices are to perform the rendering.

It is determined that the speaker devices at the positions, which correspond to the space information of the audio are to perform the rendering respectively, and the speaker devices at the positions, which do not correspond to the space information of the audio, are not to perform the rendering.

It is determined that at least two speaker devices which satisfy a preset condition in terms of positions, are to perform a same audio data, where the preset condition includes that a distance between the position of the speaker device and the position corresponding to the space information of the audio is less than a preset distance.

The embodiments of the disclosure further provide an acquisition apparatus. An acquisition space corresponding to the acquisition apparatus forms a geometry. The acquisition apparatus includes: a video acquisition device and an audio acquisition device.

Spatial positions, at which the video acquisition devices of the acquisition apparatus are deployed, cover a whole geometry. N audio acquisition devices are provided at a deployed position of each of the video acquisition devices, where N is a positive integer.

In the above solution, the acquisition apparatus further includes: a moving device, configured to receive a control instruction, and move the acquisition apparatus in response to the control instruction, such that the acquisition apparatus acquires data during moving. Or, the moving device is configured to make the acquisition apparatus static, such that the acquisition apparatus acquires data in a static state.

In the above solution, the video acquisition devices and the audio acquisition devices are deployed in such a manner that the video data acquired by all the video acquisition devices can be restored to a sphere;

the audio data acquired by all the audio acquisition devices can be restored to a sphere; or both.

In the above solution, each surface of the geometry is provided with at least one video acquisition device.

In the above solution, the acquisition apparatus further includes: a processor, configured to acquire, for the N audio acquisition devices provided at the deployed position of each of the video acquisition devices, space information of the audio acquisition devices of the acquisition apparatus, and encode audio data acquired by the N audio acquisition devices according to the space information of the audio acquisition devices to form M channels of audio data. The M channels of audio data carry space information of an audio, where M is a positive integer.

The embodiments of the disclosure further provide a data processing device. The device includes an acquiring unit and an encoding unit.

The acquiring unit is configured to acquire space information of audio acquisition devices of an acquisition apparatus. An acquisition space corresponding to the acquisition apparatus forms a geometry. Spatial positions, at which video acquisition devices of the acquisition apparatus are deployed, cover the whole geometry. N audio acquisition devices are provided at a deployed position of each of the video acquisition devices, where N is a positive integer.

The encoding unit is configured to encode, for the N audio acquisition devices provided at the deployed position of each of the video acquisition devices, audio data acquired by the N audio acquisition devices according to the space information of the audio acquisition devices to form M channels of audio data. The M channels of audio data carry space information of an audio, where M is a positive integer.

In the above solution, the device further includes: a processing unit, configured to store or send out the M channels of audio data.

The embodiments of the disclosure further provide a data processing device, which includes a receiving unit, a decoding unit, a first determining unit and a rendering unit.

The receiving unit is configured to receive M channels of encoded audio data.

The decoding unit is configured to decode the M channels of encoded audio data to acquire space information of an audio corresponding to the M channels of audio data, where M is a positive integer.

The first determining unit is configured to determine Q speaker devices corresponding to the M channels of audio data according to the acquired space information of the audio and position information of the speaker devices, where Q is a positive integer.

The rendering unit is configured to render the M channels of audio data with the determined Q speaker devices.

In the above solution, the device further includes: a second determining unit, configured to acquire, according to a moving posture of a user, orientation information of a VP and/or a region of interest (ROI) on a projection mapping volume.

The rendering unit is further configured to adjust the audio data rendered by each of the speaker devices according to the position information of the Q speaker devices and the space information of the audio.

The embodiments of the disclosure further provide a storage medium, on which a computer program is stored. When executed by a processor, the computer program performs steps of any above method.

A data processing method and device, an acquisition apparatus and a storage medium are provided by the embodiments of the disclosure. An acquisition space corresponding to the acquisition apparatus forms a geometry. Spatial positions, at which video acquisition devices of the acquisition apparatus are deployed, cover the whole geometry. N audio acquisition devices are provided at a deployed position of each of the video acquisition devices, where N is a positive integer. Spatial positions, at which video acquisition devices and the audio acquisition devices are deployed, cover the whole geometry. In this way, real omnidirectional audio acquisition may be realized. Moreover, for the N audio acquisition devices provided at the deployed position of each of the video acquisition devices, the space information of the audio acquisition devices of the acquisition apparatus is acquired. Audio data acquired by the N audio acquisition devices is encoded according to the space information of the audio acquisition devices to form M channels of audio data. The M channels of audio data carry space information of an audio, where M is a positive integer. After the M channels of encoded audio data are received, the M channels of encoded audio data are decoded to acquire the space information of an audio corresponding to the M channels of audio data. Q speaker devices corresponding to the M channels of audio data are determined according to the acquired space information of the audio and position information of the speaker devices, where Q is a positive integer. The M channels of audio data are rendered with the determined Q speaker devices. N audio acquisition devices are provided at deployed position of each of the video acquisition devices, and the audio data has the corresponding space information. In this way, immersive audio presentation of the audio data may be performed, and an effect of coordination and synchronization between spatial positions of audios and videos is realized.

BRIEF DESCRIPTION OF DRAWINGS

In the accompanying drawings (not necessarily drawn to scale), the similar reference signs may describe the similar parts in different views. The accompanying drawings generally show, by example rather than by limitation, the embodiments discussed in the present application.

DETAILED DESCRIPTION

The disclosure is further described below in combination with the accompanying drawings and embodiments.

Before the embodiments of the disclosure are described, the related technologies of VR are learned.

At present, there is usually one or two microphones provided in a VR audio acquisition device (which may also be called a VR audio capture device), therefore omnidirectional audio acquisition is not really realized.

In a process of transmission and storage, videos are mainly considered, including orientations of videos, and tiled storage and transmission of videos based on a VP and an ROI. However, there is no space information, which is related to the videos of corresponding regions, carried during audio acquisition, and it is not considered to carry the space information (including three-dimensional space coordinates or surface information) in the process of transmission and storage, therefore cooperative rendering of the orientations of audios and videos based on the VP and the ROI is not considered much. Although the cooperative rendering of audios and videos acquired through the VR in spatial positions may be realized through artificial post production, this cooperative rendering cannot realize an effect of orientation synchronization.

Based on this, in embodiments of the disclosure, space information of audio acquisition devices of an acquisition apparatus is acquired, an acquisition space corresponding to the acquisition apparatus forms a geometry, Spatial positions, at which video acquisition devices of the acquisition apparatus are deployed, cover the whole geometry, N audio acquisition devices are provided at a deployed position of each of the video acquisition devices, where N is a positive integer, audio data acquired by the N audio acquisition devices is encoded according to the space information of the audio acquisition devices to form M channels of audio data, where the M channels of audio data carry space information of an audio, and M is a positive integer.

First Embodiment

Figure 1:
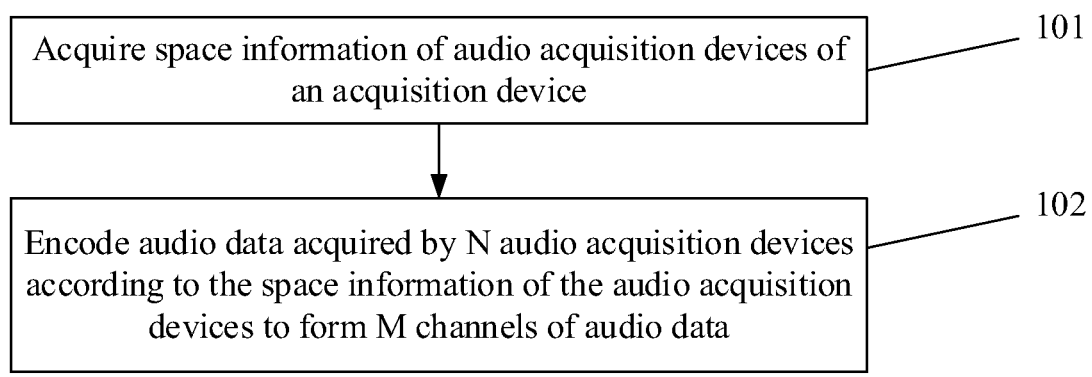
FIG. 1 is a flowchart of a data processing method according to a first embodiment of the disclosure.

The embodiments of the disclosure provide a data processing method. As illustrated in FIG. 1, the method includes the following steps.

In step S101, space information of audio acquisition devices of an acquisition apparatus is acquired.

Here, an acquisition space corresponding to the acquisition apparatus forms a geometry. Spatial positions, at which video acquisition devices of the acquisition apparatus are deployed, cover the whole geometry. N audio acquisition devices are provided at a deployed position of each of the video acquisition devices, where N is a positive integer.

That the Spatial positions, at which video acquisition devices of the acquisition apparatus are deployed, cover the whole geometry means: at least two video acquisition devices of the acquisition apparatus are provided at the spatial positions corresponding to the geometry, and the Spatial positions, at which the at least two video acquisition devices are deployed, cover a surface of the whole geometry.

In other word, all the video acquisition devices and audio acquisition devices provided in the acquisition apparatus cover the surface of the whole geometry on the spatial position.

The acquisition apparatus may be a VR acquisition device.

In practical applications, the audio acquisition device may be a microphone, and the video acquisition device may be a camera.

In practical applications, the acquired audio data sent by the acquisition apparatus may carry the space information of the audio acquisition devices such that the space information of each audio acquisition device may be learned.

The space information of the audio acquisition devices may be one of the followings: physical space information or sound pick-up space information of N microphones; and space information of a physical central point of a corresponding camera or space information of a central point of captured videos of the camera.

At least one channel of video data and audio data acquired by the acquisition apparatus satisfies at least one of the followings conditions.

The video data acquired by all the video acquisition devices may be directly restored to a sphere.

The audio data acquired by all the audio acquisition devices may be directly restored to a sphere.

In step S102, for the N audio acquisition devices provided at the deployed position of each of the video acquisition devices, audio data acquired by the N audio acquisition devices is encoded according to the space information of the audio acquisition devices to form M channels of audio data.

The M channels of audio data carry space information of an audio, where M is a positive integer.

Here, in practical applications, according to the different application scenarios of encoding, formats of the encoded audio data may include: mpega, aac, mp3, G.711, and the like.

The space information of the audio carried in the M channels of audio data is at least one of the followings: physical space information or sound pick-up space information of the N audio acquisition devices, space information of a central point of spatial positions of the N audio acquisition devices and space information of a central point of captured videos.

When M is equal to N, the space information of the audio carried in the M channels of audio data may be at least one of the followings: physical space information or sound pick-up space information of the N audio acquisition devices; space information of a central point of spatial positions of the N audio acquisition devices and space information of a central point of captured videos.

When M is less than N, the space information of the audio carried in the M channels of audio data may be at least one of the followings: space information of a central point of spatial positions of the N audio acquisition devices and space information of a central point of captured videos.

In practical applications, the space information of the audio carried in the M channels of audio data is in a form of: position information in a map in longitude and latitude, three-dimensional Cartesian coordinates in a three-dimensional coordinate system, spherical coordinates in a spherical coordinate system and orientation information relative to an opposite surface.

The encoded audio data may be stored or sent out, so as to implement interactivity of VR.

Based on this, in an embodiment, the method may further include the following operation.

The M channels of audio data are stored or sent out.

Figure 2:
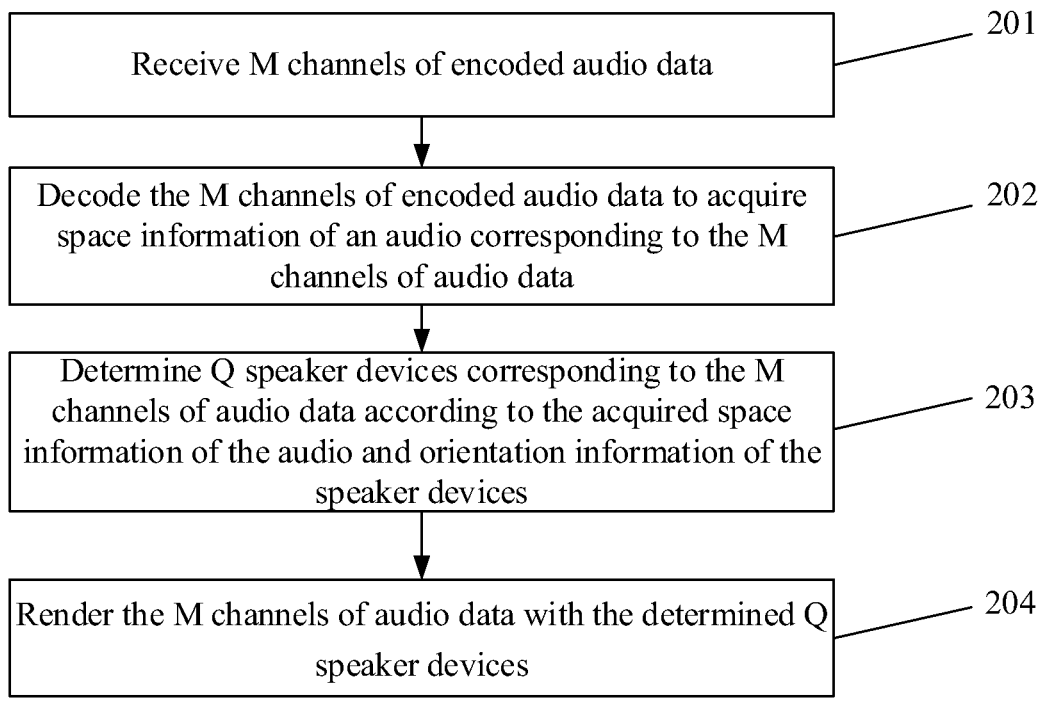
FIG. 2 is a flowchart of another data processing method according to a first embodiment of the disclosure.

Correspondingly, the embodiments of the disclosure further provide a data processing method, which may be considered as a method for implementing interactivity of VR. As illustrated in FIG. 2, the method includes the following steps.

In step S201, M channels of encoded audio data are received.

Here, it is to be noted that the received M channels of encoded audio data is the encoded data obtained through the method illustrated in FIG. 1.

In step S202, the M channels of encoded audio data are decoded to acquire the space information of an audio corresponding to the M channels of audio data.

Here, M is a positive integer.

In step S203, Q speaker devices corresponding to the M channels of audio data are determined according to the acquired space information of the audio and position information of the speaker devices.

Here, Q is a positive integer.

Specifically, it is assumed that the total number of the speaker devices is L, and L is a positive integer. When the speaker devices are determined, the following operations are performed.

In a case where M is greater than L, at least one channel of audio data, where the space information of the audio indicates that the audio is in a preset radius range around the position of each of the speaker devices, may correspond to one speaker device.

In a case where M is equal to L, and the position of each of the speaker devices is consistent with the space information of each channel of audio data, each channel of audio data may correspond to one speaker device.

In a case where M is less than L, according to the acquired space information of the audio and the position information of the speaker devices, Q speaker devices are selected from L speaker devices; or, at least one speaker device whose position is in the preset radius range around the spatial position of each channel of audio data is determined as the speaker device of each channel of audio data.

Here, in practical applications, the preset radius may be set according to needs.

In step S204, the M channels of audio data are rendered with the determined Q speaker devices.

Here, in practical applications, there may be at least two channels of, but not one channel of, audio data to be rendered by each of the speaker devices; in this case, it is needed to mix the at least two channels of audio data, namely to perform audio mixing processing.

It can be seen from the above description that the step of rendering the M channels of audio data with the determined Q speaker devices may include at least one of the following operations.

At least two channels of audio data in a preset radius range around the position of the speaker device are mixed, and then mixed audio data is rendered.

It is determined that the speaker devices, of which positions are consistent with vectors of the audio acquisition devices are to perform the rendering.

It is determined that the speaker devices at the positions, which correspond to the space information of the audio are to perform the rendering respectively, and the speaker devices at the positions, which do not correspond to the space information of the audio, are not to perform the rendering.

It is determined that at least two speaker devices which satisfy a preset condition in terms of positions, are to perform a same audio data, where the preset condition includes that a distance between the position of the speaker device and the position corresponding to the space information of the audio is less than a preset distance.

The preset radius and the preset distance may be set according to needs.

In practical applications, except the basic audio rendering operation described in step S204, the audio rendering may also be performed in combination with the ROI or VP of videos.

Based on this, in an embodiment, the method may further include the following operations.

According to a moving posture of a user, orientation information of a VP and/or an ROI on a projection mapping volume is acquired, and the position information corresponding to the Q speaker devices may be acquired.

The audio data rendered by each of the speaker devices is adjusted according to the position information of the Q speaker devices and the space information of the audio.

Here, in practical applications, the position information of the speaker devices may be the corresponding position information on the projection mapping volume, or may not be the corresponding position information on the projection mapping volume. How to adjust the audio data rendered by the speaker devices may be determined by calculation based on the position information of the speaker devices.

It is to be noted that in practical applications, for the N audio acquisition devices provided at the deployed position of each of the video acquisition devices, above rendering operation is performed on all the formed M channels of encoded audio data.

Figure 3:
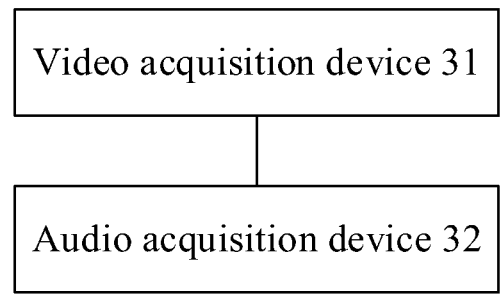
FIG. 3 is a structure schematic diagram of an acquisition apparatus according to a second embodiment of the disclosure.

With the data processing method provided by the embodiments of the disclosure, the space information of the audio acquisition devices of the acquisition apparatus is acquired. The Spatial positions, at which video acquisition devices of the acquisition apparatus are deployed, cover a whole geometry. N audio acquisition devices are provided at a deployed position of each of the video acquisition devices, where N is a positive integer. For the N audio acquisition devices provided at the deployed position of each of the video acquisition devices, the audio data acquired by the N audio acquisition devices is encoded according to the space information of the audio acquisition devices to form M channels of audio data, where the M channels of audio data carry the space information of an audio, and the M is a positive integer. After the M channels of encoded audio data are received, the M channels of encoded audio data are decoded to acquire the space information of an audio corresponding to the M channels of audio data. Q speaker devices corresponding to the M channels of audio data are determined according to the acquired space information of the audio and position information of the speaker devices, where Q is a positive integer. The M channels of audio data are rendered with the determined Q speaker devices. N audio acquisition devices are provided at a deployed position of each of the video acquisition devices, and the audio data has the corresponding space information. In this way, immersive audio presentation of the audio data may be performed, an effect of coordination and synchronization between spatial positions of audios and videos is realized, and the audio data has the corresponding space information. In this way, immersive audio presentation of the audio data may be performed, an effect of coordination and synchronization between spatial positions of audios and videos is realized Second Embodiment It can be seen from the first embodiment that the acquisition apparatus provided by the embodiments of the disclosure may acquire the audio data omnidirectionally. Based on this, the embodiments of the disclosure provide an acquisition apparatus. An acquisition space corresponding to the acquisition apparatus forms a geometry. As illustrated in FIG. 3, the acquisition apparatus includes: a video acquisition device 31 and an audio acquisition device 32.

The Spatial positions, at which video acquisition devices 31 of the acquisition apparatus are deployed, cover the whole geometry.

N audio acquisition devices 32 are provided at a deployed position of each of the video acquisition devices 31, where N is a positive integer.

That the spatial positions, at which video acquisition devices 31 of the acquisition apparatus are deployed, cover the whole geometry means: at least two video acquisition devices 31 of the acquisition apparatus are provided at the spatial positions corresponding to the geometry, and the spatial positions, at which the at least two video acquisition devices 31 of the acquisition apparatus are deployed, cover the surface of the whole geometry.

In other word, all the video acquisition devices 31 and audio acquisition devices 32 provided in the acquisition apparatus cover the surface of the whole geometry on the spatial position.

In practical applications, each surface of the geometry may be provided with at least one video acquisition device 31, so as to cover the surface of the whole geometry on the spatial position.

Besides it, in a case where there are multiple audio acquisition devices 32 provided at the deployed position of each of the video acquisition devices 31, at least two audio acquisition devices 32 provided at the deployed position of each of the video acquisition devices 31 are provided surrounding the video acquisition device.

The acquisition apparatus may be a VR acquisition device.

In practical applications, the audio acquisition device 32 may be a microphone, and the video acquisition device 31 may be a camera.

In an embodiment, the video acquisition devices and the audio acquisition devices are deployed in such a manner that
the video data acquired by all the video acquisition devices 31 may be directly restored to a sphere;
the audio data acquired by all the audio acquisition devices 32 may be directly restored to a sphere; or
both.

That is, all the video acquisition devices 31 may restore the video data on longitude and latitude by 360 degrees. All the audio acquisition devices 32 may restore the audio data on longitude and latitude by 360 degrees.

In an embodiment, the acquisition apparatus may implement functions of capturing videos and sound pick-up in a moving or static state.

Based on this, in an embodiment, the acquisition apparatus may further include: a moving device, configured to receive a control instruction, and move the acquisition apparatus in response to the control instruction, such that the acquisition apparatus acquires data during moving, or configured to make the acquisition apparatus static, such that the acquisition apparatus acquires data in a static state.

Here, in practical applications, the specific functions of the moving device may be similar to specific functions of a flying camera, and the specific composition may include: a paddle, a power drive, and the like.

In an embodiment, the acquisition apparatus may further include: a processor, configured to acquire, for the N audio acquisition devices provided at the deployed position of each of the video acquisition devices, the space information of the audio acquisition devices of the acquisition apparatus, and encode the audio data acquired by the N audio acquisition devices according to the space information of the audio acquisition devices to form M channels of audio data, where the M channels of audio data carry the space information of an audio, and M is a positive integer.

The space information of the audio carried in the M channels of audio data may be at least one of the followings: physical space information or sound pick-up space information of the N audio acquisition devices, space information of a central point of spatial positions of the N audio acquisition devices, and space information of a central point of captured videos.

The space information of the audio carried in the M channels of audio data is in a form of: position information in a map in longitude and latitude, three-dimensional Cartesian coordinates in a three-dimensional coordinate system, spherical coordinates in a spherical coordinate system and orientation information relative to an opposite surface.

The acquisition apparatus is provided by the embodiments of the disclosure. An acquisition space corresponding to the acquisition apparatus forms a geometry. The Spatial positions, at which video acquisition devices of the acquisition apparatus are deployed, cover the whole geometry. N audio acquisition devices are provided at a deployed position of each of the video acquisition devices, where N is a positive integer. The Spatial positions, at which the video acquisition devices and the audio acquisition devices are deployed, cover the whole geometry. In this way, real omnidirectional audio acquisition may be realized.

Third Embodiment

Based on the second embodiment, the present embodiment describes arrangement modes of all parts of the acquisition apparatus in detail.

In the present embodiment, the video acquisition device is a camera, and the audio acquisition device is a microphone.

It can be seen from the second embodiment that a VR acquisition device is a combination of microphone and camera, which has a corresponding geometry. Microphones with the VR acquisition device may implement omnidirectional audio acquisition, therefore these microphones may be called geometry VR omnidirectional microphone.

The geometry includes a basic geometry and an assembly geometry. The basic geometry includes rotating bodies (sphere, cylinder, and the like) and polyhedrons (Platonic solid and non-Platonic solid). The assembly geometry is a geometry combined by more than two basic geometries in the same or different types.

The geometry VR omnidirectional microphone has a function of picking up sound in a moving or static state. That is, audio acquisition may be realized when the VR acquisition device is moving or static. Apparently, when the VR acquisition device is moving or static, a camera may implement a function of capturing videos.

The spatial positions, at which the microphone and the camera are deployed, cover the whole geometry. The audios acquired by the geometry VR omnidirectional microphone may be restored to a sphere, and the videos acquired by all the cameras may be restored to a sphere. That is, the acquired audios may be restored on longitude and latitude by 360 degrees.

Deployed positions of the microphones are described below in detail.

The number of microphones on each surface of the geometry is N, where N is a positive integer.

Figure 4A:
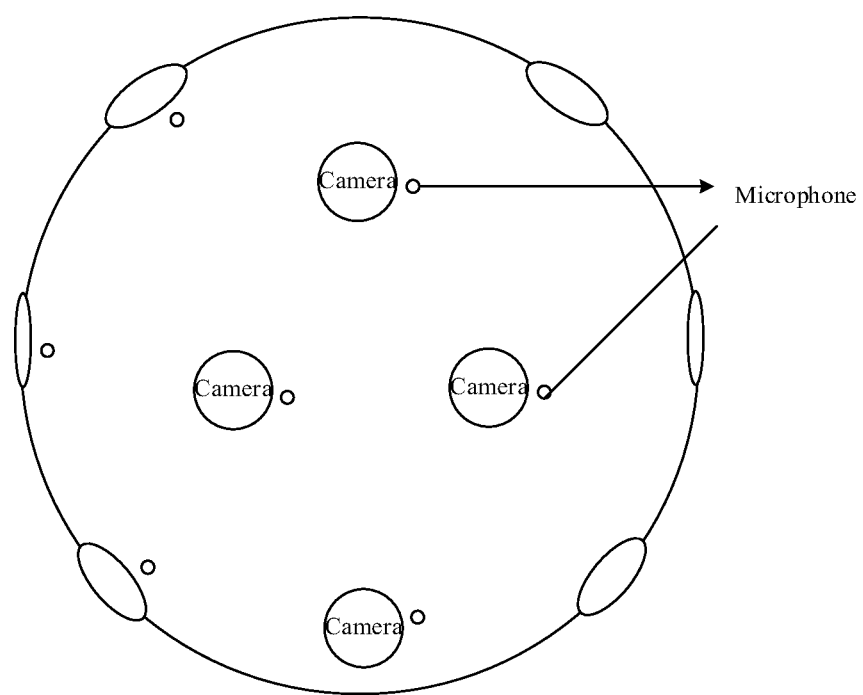
FIG. 4A and FIG. 4B are a structure schematic diagram of an acquisition apparatus according to a third embodiment of the disclosure.
Figure 4B:
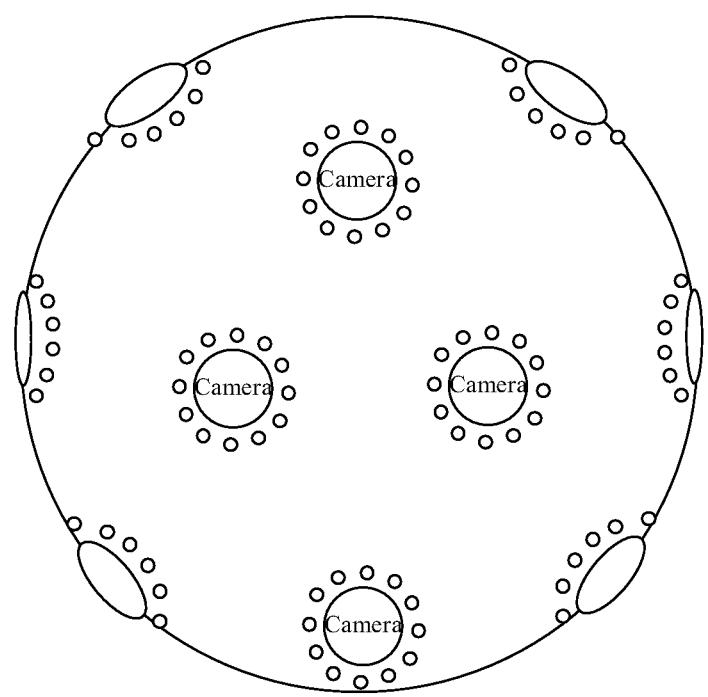

As illustrated in FIG. 4A and FIG. 4B, in a case where the geometry is a sphere, that is, the omnidirectional microphone is a spheroidal VR omnidirectional microphone, a position of each camera corresponds to one or more microphones. Specifically, in FIG. 4A, the number of microphones corresponding to the position of each camera is 1. In FIG. 4B, there are multiple microphones corresponding to the position of each camera, and the multiple microphones are deployed surrounding the camera. Specifically, the camera is taken as a central point of a concentric circle, and the multiple microphones are deployed in one or more circles surrounding the camera.

Figure 5A:
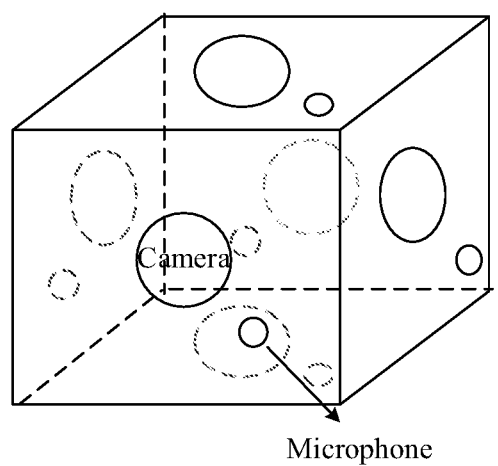
FIG. 5A and FIG. 5B are a structure schematic diagram of another acquisition device according to a third embodiment of the disclosure.
Figure 5B:
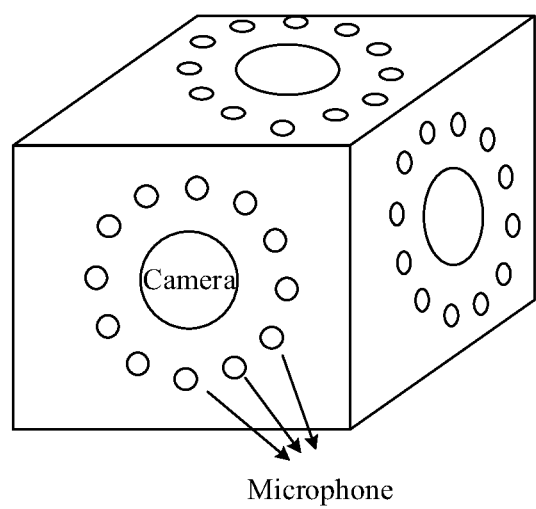

As illustrated in FIG. 5A and FIG. 5B, in a case where the geometry is a cube, that is, the omnidirectional microphone is a cubic VR omnidirectional microphone, the position of each camera corresponds to one or more microphones. Specifically, in FIG. 5A, the number of microphones corresponding to the position of each camera is 1. In FIG. 5B, there are multiple microphones corresponding to the position of each camera, and the multiple microphones are deployed surrounding the camera. Specifically, the camera is taken as a central point of a concentric circle, and the multiple microphones are deployed in one or more circles surrounding the camera.

Figure 6A:
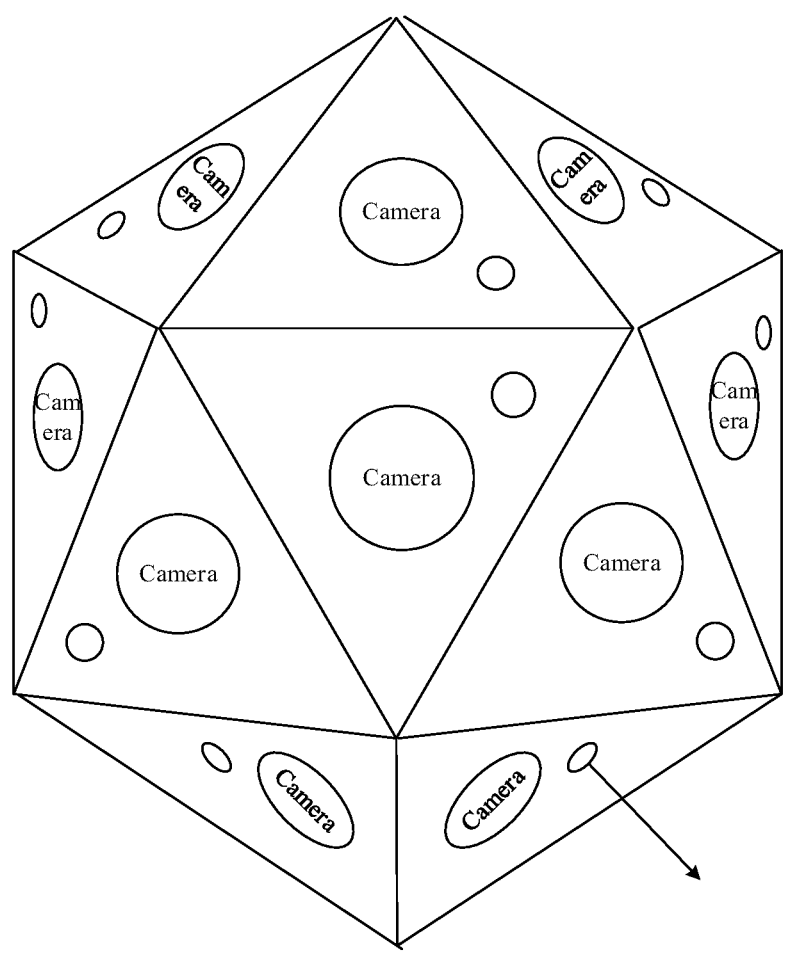
FIG. 6A and FIG. 6B are a structure schematic diagram of another acquisition device according to a third embodiment of the disclosure.
Figure 6B:
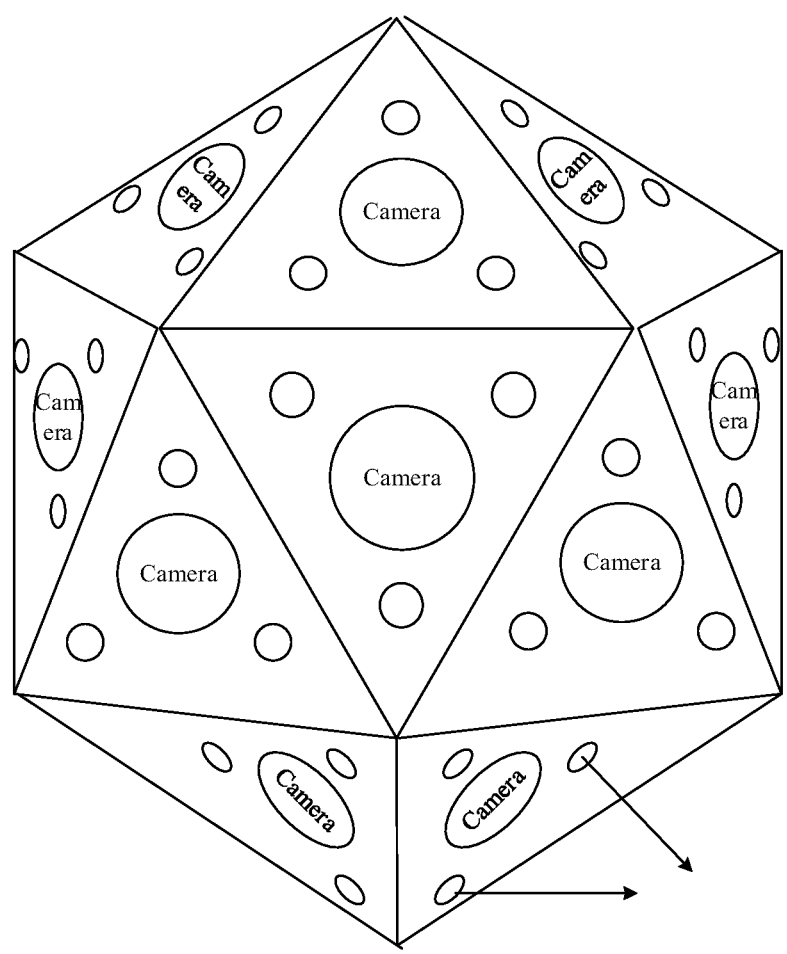

As illustrated in FIG. 6A and FIG. 6B, when the geometry is a regular icosahedron, that is, the omnidirectional microphone is a regular icosahedral VR omnidirectional microphone, the position of each camera corresponds to one or more microphones. Specifically, in FIG. 6A, the number of microphones corresponding to the position of each camera is 1. In FIG. 6B, there are multiple microphones corresponding to the position of each camera, and the multiple microphones are dispersedly deployed surrounding the camera.

Fourth Embodiment

In the present embodiment, the VR acquisition device described in the second embodiment and the third embodiment is adopted to acquire audio data.

Based on the first embodiment, the present embodiment describes a process of encoding the acquired audio data in detail.

The audio data acquired by N microphones may carry one of the followings: physical space information or sound pick-up space information of N microphones and space information of a physical central point of a corresponding camera or space information of a central point of videos captured by the corresponding camera.

The audio data acquired by the N microphones are encoded into M audios, where M is a positive integer.

The M encoded audios carry the space information of the audio.

Encoding is performed according to encoding formats (such as mpega, aac, mp3 or G.711).

After encoding, encoded audio data carrying the space information of the audio is stored. When the encoded data is stored, the space information of the audio is encapsulated according to encapsulation formats (such as an ISOBMFF file and a is file).

Apparently, if it is needed to transmit an audio file, the encoded audio data carrying the space information of the audio is encapsulated based on provisions of transmission protocols (such as, DASH, Hypertext Transmission Protocol (HTTP), HTTP Live Streaming (HLS), and Real-time Transport Protocol (RTP)).

Figure 7:
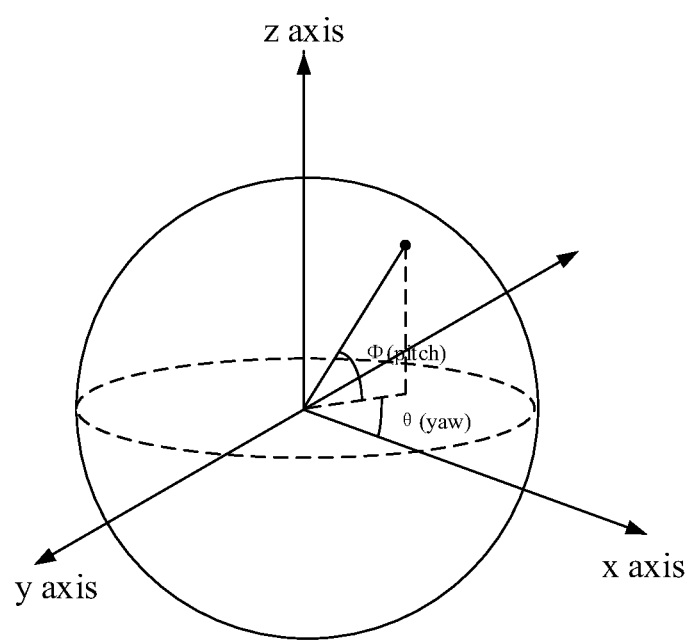
FIG. 7 is a schematic diagram of space information in a form of spherical coordinates according to a fourth embodiment of the disclosure.

Here, the forms of the carried space information may be at least one of the followings: position information in a map in longitude and latitude, three-dimensional Cartesian coordinates in a three-dimensional coordinate system, spherical coordinates in a spherical coordinate system (as illustrated in FIG. 7) and orientation information relative to an opposite surface.

Figure 8:
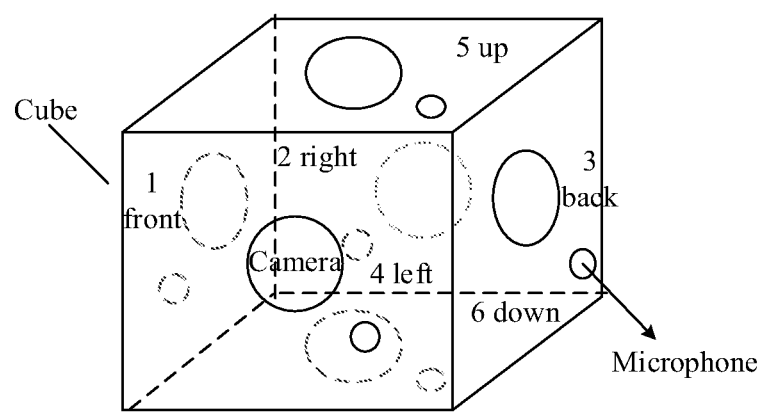
FIG. 8 is a schematic diagram of space information of surface information of cube according to a fourth embodiment of the disclosure.
Figure 9:
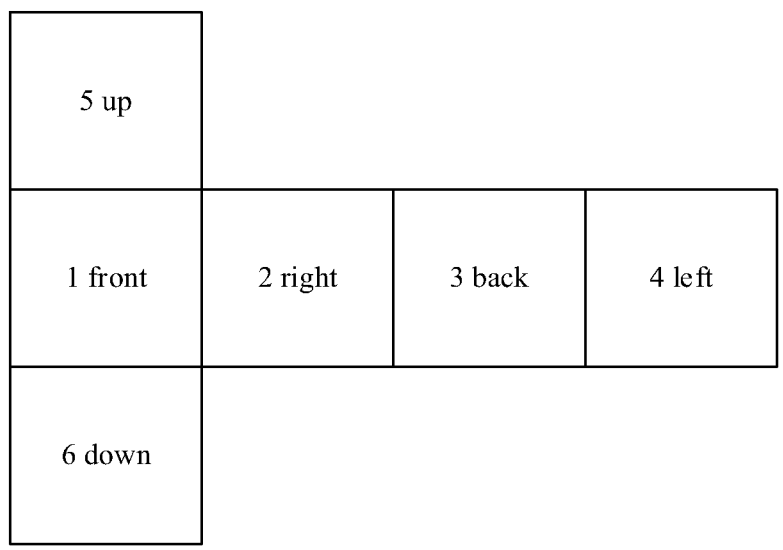
FIG. 9 is a schematic diagram of space information after the space information in FIG. 8 is unfolded according to a fourth embodiment of the disclosure.

Here, the orientation information may be surface information of a geometry surface where the camera is provided, as illustrated in FIG. 8 or FIG. 9.

In a case where M is equal to N, the space information carried in the M audios corresponds to physical space information or sound pick-up space information of the N microphones or space information of a physical central point of a corresponding camera, or space information of a central point of videos captured by the corresponding camera, such as, a situation where the number of microphones corresponding to each camera is 1.

When M is equal to 1, the space information carried by the M audios is space information of a physical central point or space information of a central point of a sound pick-up space of the N microphones, or space information of a physical central point of a corresponding camera or space information of a central point of videos captured by the corresponding camera, such as, a situation where the number of microphones corresponding to the position of each camera is N.

Apparently, in a process of practical applications, in a case where the encoded audio data carries the space information of the audio, it is needed to expand Audio Space Information Parameter, so as to describe the audio carrying the space information. An expanding process is described as follows.

```
Class VR AudioSpaceInfo
{
if (VR_projection_type==(ERP)){
        short  yaw;
        shortpitch;
        }
if (VR_projection_type==(Platonic Solid)){
                ussigned int(8)   num_faces;
                ussigned int(8)   face_id;
    }
}
```

Fifth Embodiment

In the present embodiment, the VR acquisition device described in the second embodiment and the third embodiment is adopted to acquire audio data.

Based on the first embodiment, the present embodiment describes the process of using the acquired audio data to perform rendering in detail.

During basic rendering, it is needed to consider the number and position of the speaker devices when the basic rendering is performed on M channels of encoded audio data.

Figure 10:
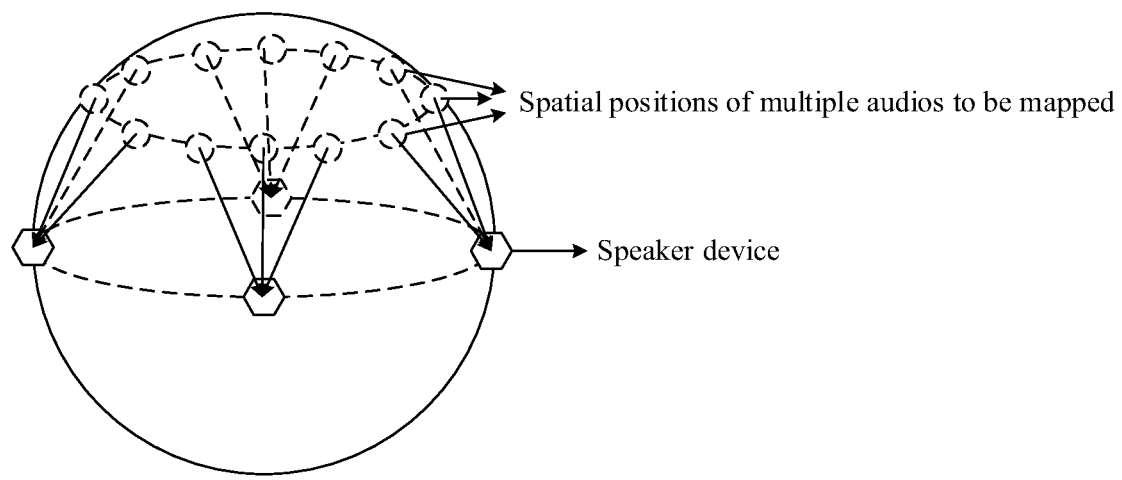
FIG. 10 is a schematic diagram of audio rendering when M is greater than the number of speaker devices according to a fifth embodiment of the disclosure.

Specifically, in a case where M is greater than the number of speaker devices, after the audios near the positions of the speaker devices are mixed, mixed audios are converged and rendered. Specifically, for M decoded audios, according to the space information of each audio and a position of a current speaker device corresponding to each audio, the audios near the positions of the speaker device are rendered in an immersive mode after being mixed. As illustrated in FIG. 10, after multiple audios at positions corresponding to an upper semicircle are converged (mixing process), corresponding four speaker devices perform rendering. Considerations are applied to other positions in the same way.

Figure 11:
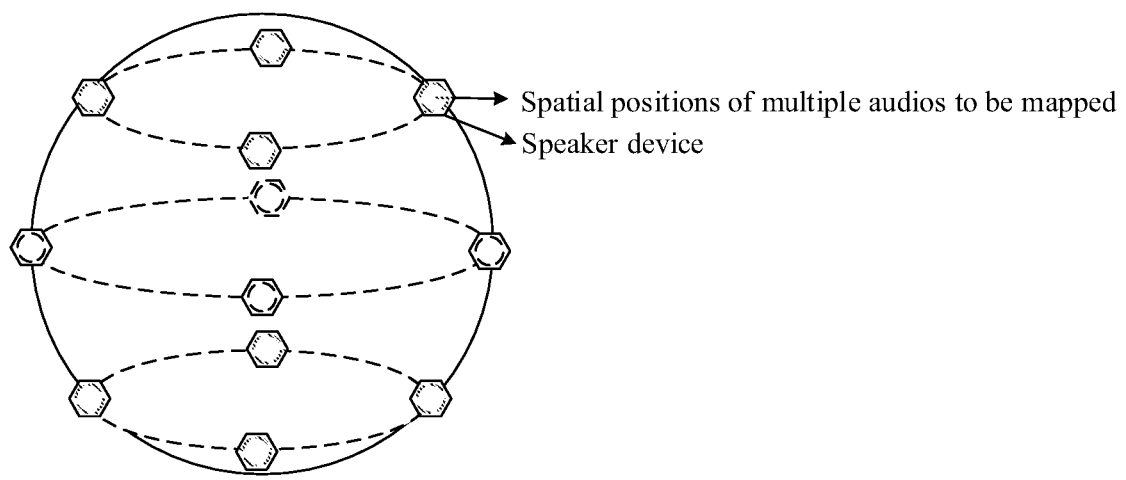
FIG. 11 is a schematic diagram of audio rendering when M is equal to the number of speaker devices according to a fifth embodiment of the disclosure.

When M is equal to the number of speaker devices, and the position of each of the speaker devices is consistent with a vector of each microphone, the speaker devices perform rendering in one-to-one correspondence, as illustrated in FIG. 11.

Figure 12A:
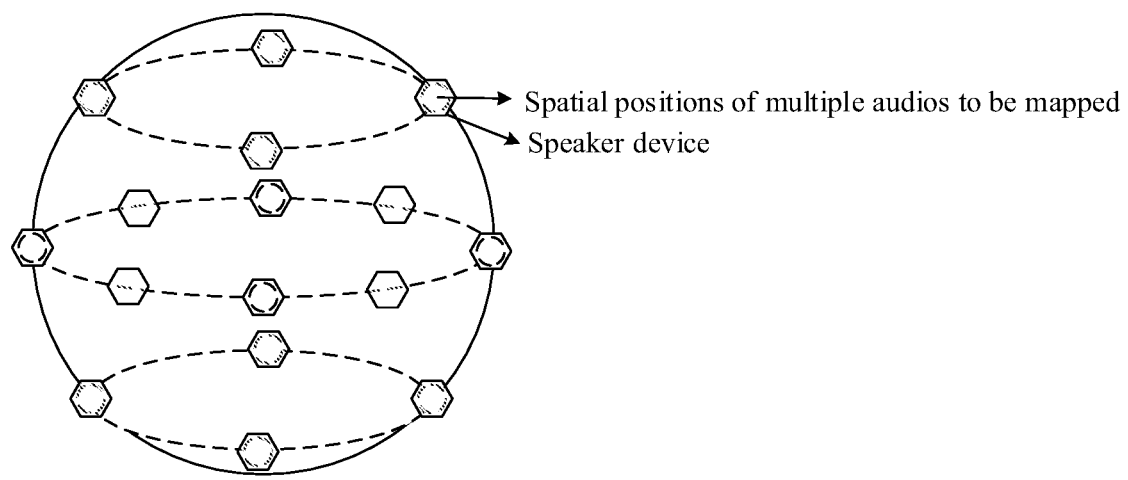
FIG. 12A and FIG. 12B are a schematic diagram of audio rendering when M is less than the number of speaker devices according to a fifth embodiment of the disclosure.
Figure 12B:
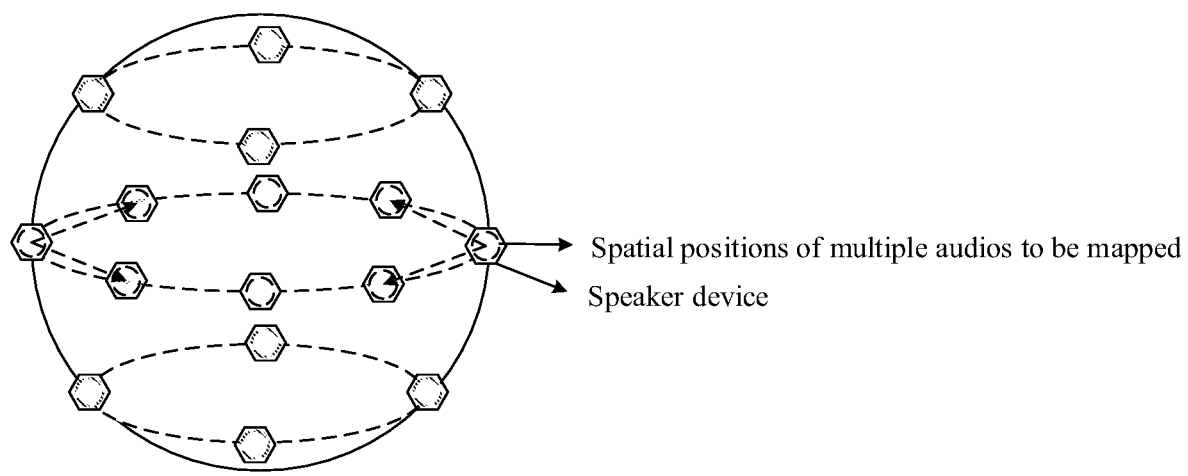

When M is less than the number of speaker devices, partially corresponding rendering may be performed (the speaker devices with positions corresponding to the audio data perform rendering one by one, and the rest speaker devices do not perform rendering, as illustrated in FIG. 12A); or dispersive rendering is performed, that is, the speaker devices close to each other render the same audio, as illustrated in FIG. 12B.

Sixth Embodiment

Except the basic audio rendering described in the fifth embodiment, the audio rendering may also be performed in combination with the ROI or VP of videos. The present embodiment describes the process of rendering based on the ROI and/or the VP.

Figure 13A:
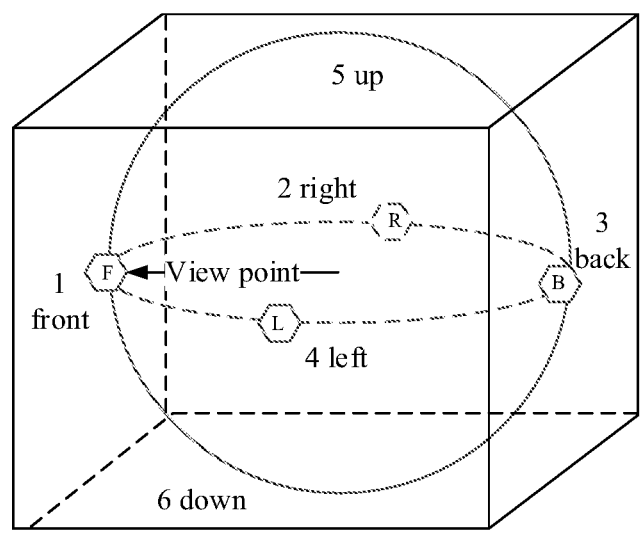
FIG. 13A and FIG. 13B are a schematic diagram of audio rendering based on a region of interest or a VP according to a sixth embodiment of the disclosure.
Figure 13B:
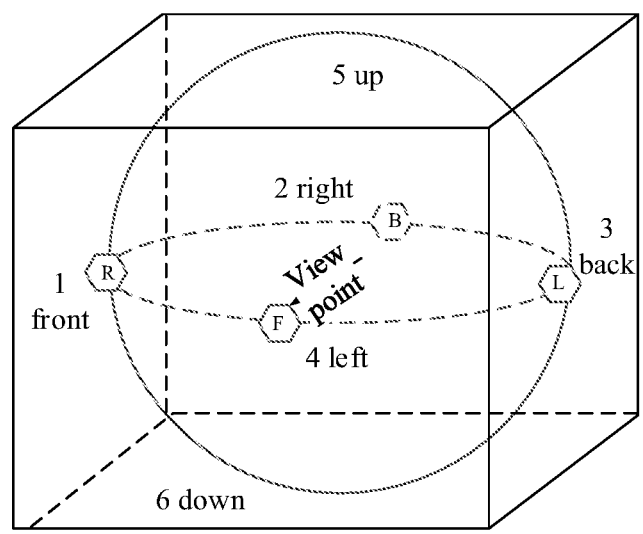

FIG. 13A and FIG. 13B are a schematic diagram of deployment of microphones and audio rendering when an audio carries relative orientation information. It can be seen from FIG. 13A and FIG. 13B, inscribed circles in the figures are VR rendering devices, and four microphones are deployed. F is on an orientation directly facing a human face, L and R are on orientations of left and right ears respectively, and B is on an orientation of a center of metencephalon. The cube is a restored projection mapping volume, corresponding to an acquisition orientation illustrated in FIG. 8 or FIG. 9. An audio acquired by the microphone on each surface carries the relative orientation information face_Id. As illustrated in FIG. 13A, it is assumed that a current VP is "1 front", an audio of an orientation "1 front" is rendered by the speaker device F correspondingly, an audio of an orientation "2 right" is rendered by the speaker device R correspondingly, an audio of an orientation "3 back" is rendered by the speaker device B correspondingly, and an audio of an orientation "4 left" is rendered by the speaker device L correspondingly. When the VP changes from "1 front" to "4 left", the orientations of the speaker devices on the inscribed circle change relative to the cube; in this case, as illustrated in FIG. 13B, the audio acquired from the orientation "4 left" is rendered by the speaker device F correspondingly, the audio acquired from the orientation "1 front" is rendered by the speaker device R correspondingly, the audio acquired from the orientation "2 right" is rendered by the speaker device B correspondingly, and the audio acquired from the orientation "3 back" is rendered by the speaker device L correspondingly. For example, in an actual sound effect, it is assumed that a sound of water (rendered by the speaker device L) comes from the orientation "4 left" when the VP is "2 front", after the head rotates, and the VP changes to "4 left", and then the sound of water (rendered by the speaker device F) comes from the front.

Figure 14A:
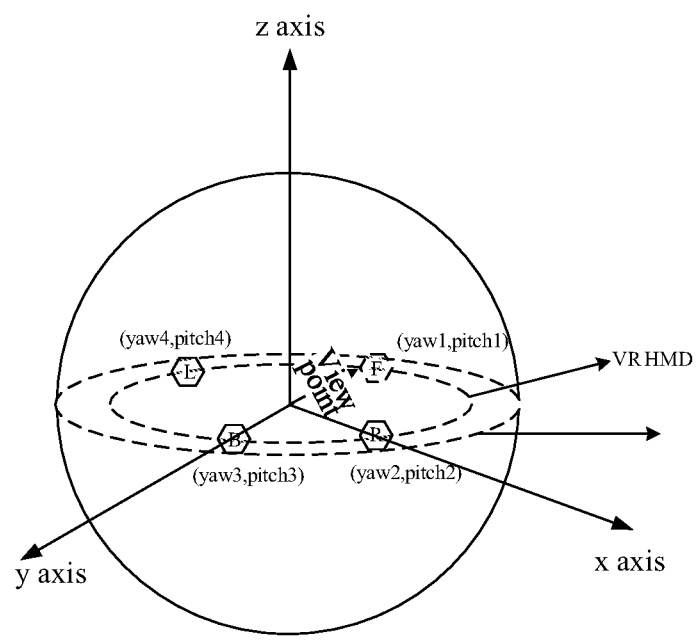
FIG. 14A and FIG. 14B are another schematic diagram of audio rendering based on a region of interest or a VP according to a sixth embodiment of the disclosure.
Figure 14B:
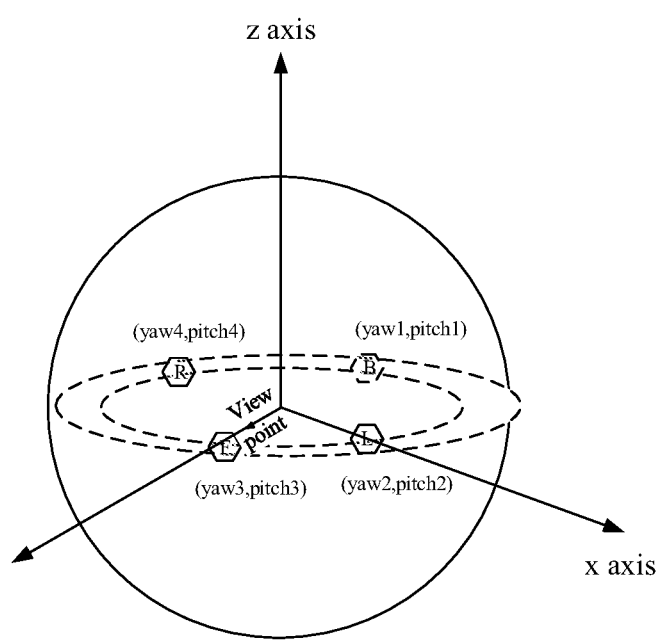

FIG. 14A and FIG. 14B are a schematic diagram of deployment of microphones and audio rendering when an audio carries spherical coordinate orientation information. It can be seen from FIG. 14A and FIG. 14B, an inner concentric circle in the figures are VR rendering devices, and four microphones are deployed. F is on an orientation directly facing a human face, L and R are on orientations of left and right ears respectively, and B is on an orientation of a center of metencephalon. An outer concentric circle is a projection mapping volume. As illustrated in FIG. 14, it is assumed that a current VP is (yaw1, pitch1), an audio of this orientation is rendered by the speaker device F correspondingly, an audio of an orientation (yaw2, pitch2) is rendered by the speaker device R correspondingly, an audio of an orientation (yaw3, pitch3) is rendered by the speaker device B correspondingly, and an audio of an orientation (yaw4, pitch4) is rendered by the speaker device L correspondingly. When the VP changes from (yaw1, pitch1) to (yaw3, pitch3), the orientations of the speaker devices on the concentric circle change relative to the cube. In this case, as illustrated in FIG. 14B, the audio of (yaw3, pitch3) is rendered by the speaker device F correspondingly, the audio of (yaw4, pitch4) is rendered by the speaker device R correspondingly, the audio of (yaw1, pitch1) is rendered by the speaker device B correspondingly, and the audio of (yaw2, pitch2) is rendered by the speaker device L correspondingly.

Figure 15:
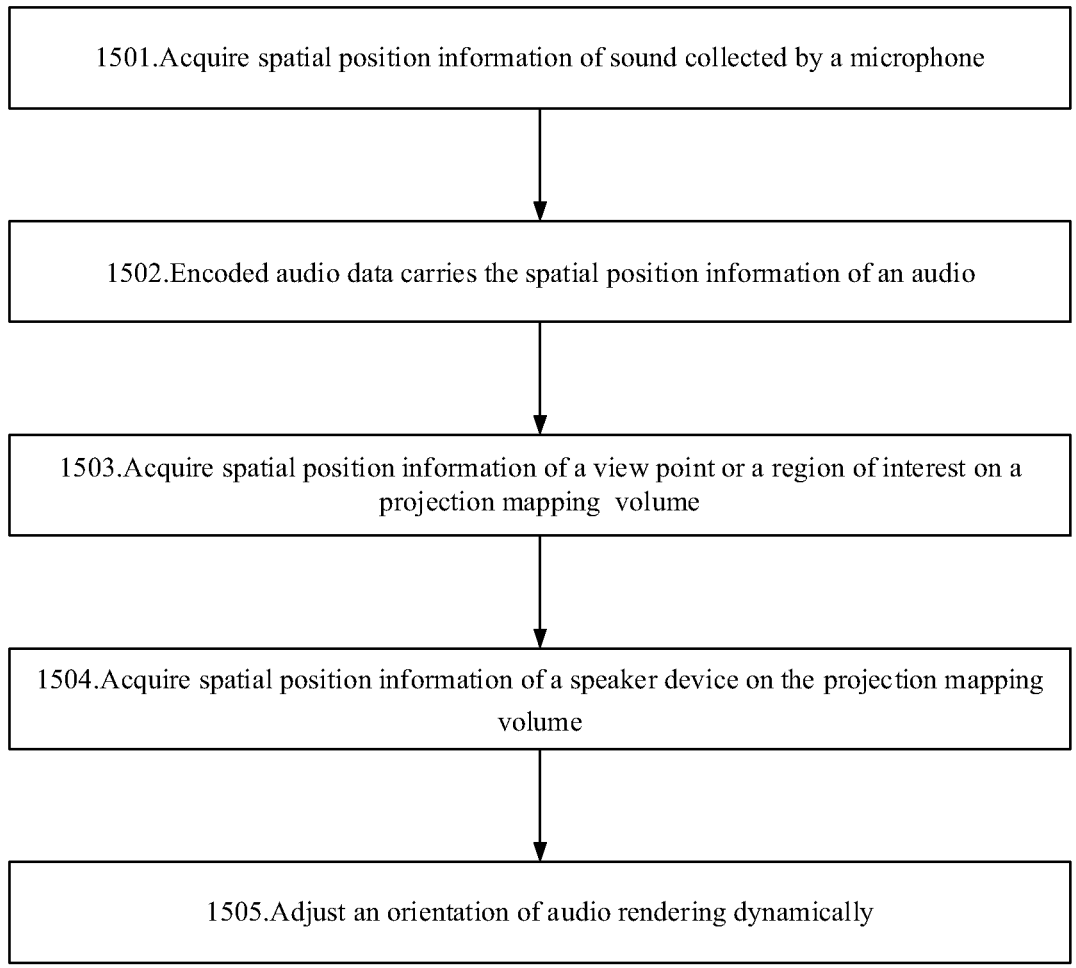
FIG. 15 is a flowchart of audio rendering based on a region of interest or a VP according to a sixth embodiment of the disclosure.

It can be seen from the description above that for the rendering based on the VP and/or the ROI, as illustrated in FIG. 15, first spatial position information of sound collected by the microphone is acquired (step S1501). The spatial position information of the sound collected is considered during encoding the audio, that is, the encoded audio data carries the spatial position information of the audio (step S1502). Orientation information of the VP and/or the ROI on the projection mapping volume is acquired according to movements of head or eyes (step S1503). The position information of the speaker devices on the projection mapping volume is acquired (step S1504). According to the position information (spherical coordinates/face ids) carried by multiple audios, an orientation of audio rendering is dynamically adjusted in combination with a basic rendering rule (step S1505).

Seventh Embodiment

Figure 16:
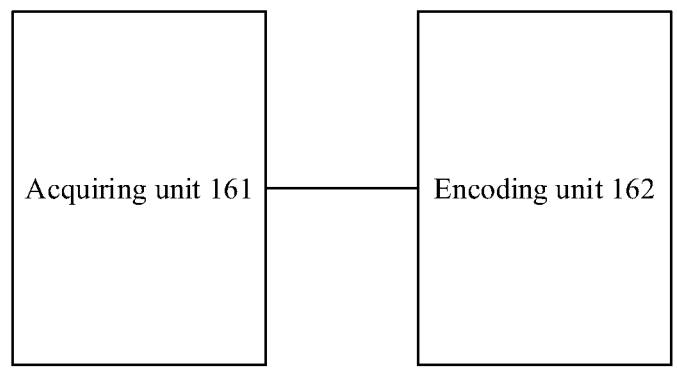
FIG. 16 is a structure schematic diagram of a data processing device according to a seventh embodiment of the disclosure.

In order to implement the method in the first embodiment of the disclosure, the present embodiment further provides a data processing device. As illustrated in FIG. 16, the device includes an acquiring unit 161 and an encoding unit 162.

The acquiring unit 161 is configured to acquire space information of audio acquisition devices of an acquisition apparatus. The acquisition space corresponding to the acquisition apparatus forms a geometry. The Spatial positions, at which the video acquisition devices of the acquisition apparatus are deployed, cover the whole geometry. N audio acquisition devices are provided at a deployed position of each of the video acquisition devices, where N is a positive integer.

The encoding unit 162 is configured to encode, for the N audio acquisition devices provided at the deployed position of each of the video acquisition devices, the audio data acquired by the N audio acquisition devices according to the space information of the audio acquisition devices to form M channels of audio data, where the M channels of audio data carry the space information of an audio, and M is a positive integer.

That the spatial positions, at which the video acquisition devices of the acquisition apparatus are deployed, cover the whole geometry means: at least two video acquisition devices of the acquisition apparatus are provided at spatial positions corresponding to the geometry, and the spatial positions, at which the at least two video acquisition devices are deployed, cover a surface of the whole geometry.

For the video acquisition devices and the audio acquisition devices deployed on the acquisition apparatus, in other word, all the video acquisition devices and the audio acquisition devices provided in the acquisition apparatus cover the surface of the whole geometry on the spatial position.

The acquisition apparatus may be a VR acquisition device.

In practical applications, the audio acquisition device may be a microphone, and the video acquisition device may be a camera.

In practical applications, the acquired audio data sent by the acquisition apparatus may carry the space information of the audio acquisition devices such that the space information of each audio acquisition device may be learned.

The space information of the audio acquisition device may be one of the followings: physical space information or sound pick-up space information of N microphones and space information of a physical central point of a corresponding camera or space information of a central point of videos captured by the corresponding camera.

Video data and/or the audio data acquired by the acquisition apparatus satisfies at least one of the conditions.

The video data acquired by all the video acquisition devices may be directly restored to a sphere.

The audio data acquired by all the audio acquisition devices may be directly restored to a sphere.

Here, in practical applications, according to the different application scenarios of encoding, formats of the encoded audio data may be mpega, aac, mp3, G.711, and so on.

The space information of the audio carried in the M channels of audio data is at least one of the followings: physical space information or sound pick-up space information of the N audio acquisition devices, space information of a central point of spatial positions of the N audio acquisition devices and space information of a central point of captured videos.

When M is equal to N, the space information of the audio carried in the M channels of audio data may be at least one of the followings: physical space information or sound pick-up space information of the N audio acquisition devices, space information of a central point of spatial positions of the N audio acquisition devices and space information of a central point of captured videos.

When M is less than N, the space information of the audio carried in the M channels of audio data may be at least one of the followings: space information of a central point of spatial positions of the N audio acquisition devices and space information of a central point of captured videos.

In practical applications, the space information of the audio carried in the M channels of audio data is in a form of: position information in a map in longitude and latitude, three-dimensional Cartesian coordinates in a three-dimensional coordinate system, spherical coordinates in a spherical coordinate system and orientation information relative to an opposite surface.

The encoded audio data may be stored or sent out, so as to implement interactivity of VR.

Based on this, in an embodiment, the device may further include: a processing unit, configured to store or send out the M channels of audio data.

In practical applications, the acquiring unit 161, the encoding unit 162 and the processing unit may be implemented by a processor in the data processing device.

Figure 17:
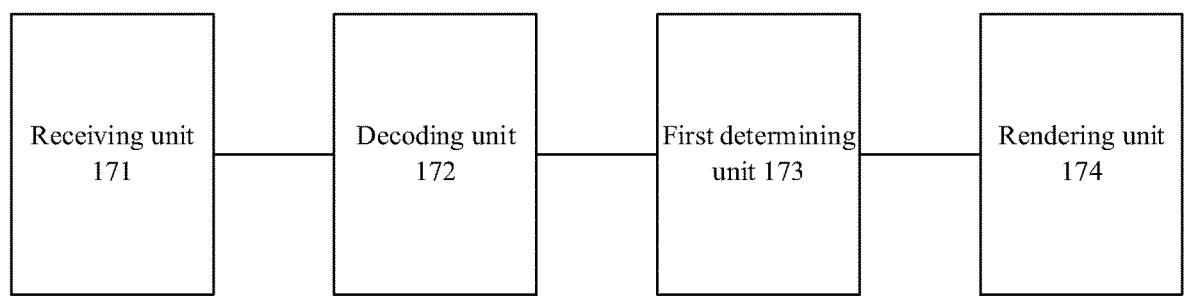
FIG. 17 is a structure schematic diagram of another data processing device according to a seventh embodiment of the disclosure.

Correspondingly, in order to implement the method of the embodiments of the disclosure, the present embodiment further provides a data processing device. As illustrated in FIG. 17, the device includes: a receiving unit 171, a decoding unit 172, a first determining unit 173, and a rendering unit 174.

The receiving unit 171 is configured to receive the M channels of encoded audio data.

The decoding unit 172 is configured to decode the M channels of encoded audio data to acquire space information of an audio corresponding to the M channels of audio data, where M is a positive integer.

The first determining unit 173 is configured to determine Q speaker devices corresponding to the M channels of audio data according to the acquired space information of the audio and position information of the speaker devices, where Q is a positive integer.

The rendering unit 174 is configured to render the M channels of audio data with the determined Q speaker devices.

Here, it is to be noted that the received M channels of encoded audio data, which is received by the receiving unit 171, is encoded data obtained through the method illustrated in FIG. 1.

It is assumed that the total number of the speaker devices is L, and L is a positive integer. In a process of determining the speaker devices, following operations are performed.

In a case where M is greater than L, the first determining unit 173 makes at least one channel of audio data, where the space information of the audio indicates that the audios are in a preset radius range around the position of each of the speaker devices, correspond to one speaker device.

In a case where M is equal to L, and the position of each of the speaker devices is consistent with the space information of each channel of audio data, the first determining unit 173 makes each channel of audio data correspond to one speaker device.

In a case where M is less than L, according to the acquired space information of the audio and the position information of the speaker devices, the first determining unit 173 selects Q speaker devices from L speaker devices; or, the first determining unit 173 determines at least one speaker device whose position is in the preset radius range around the spatial position of each channel of audio data as the speaker device of each channel of audio data.

Here, in practical applications, the preset radius may be set according to needs.

Here, in practical applications, there may be at least two channels of, but not one channel of, audio data to be rendered by each of the speaker devices; in this case, it is needed to mix the at least two channels of audio data, namely performing audio mixing processing.

It can be seen from the above description that a process of rendering the M channels of audio data with the determined Q speaker devices may include at least one of the following operations.

At least two channels of audio data in the preset radius range around the position of the speaker device are mixed, and mixed audio data is rendered.

It is determined that the speaker devices, of which positions are consistent with vectors of the audio acquisition devices are to perform the rendering.

It is determined that the speaker devices at the positions, which correspond to the space information of the audio are to perform the rendering respectively, and the speaker devices at the positions, which do not correspond to the space information of the audio, are not to perform the rendering.

It is determined that at least two speaker devices which satisfy a preset condition in terms of positions, are to perform a same audio data, where the preset condition includes that a distance between the position of the speaker device and the position corresponding to the space information of the audio is less than a preset distance.

The preset radius and the preset distance may be set according to needs.

In practical applications, except the basic audio rendering operation described above, the audio rendering may also be performed in combination with the ROI or VP of videos.

Based on this, in an embodiment, the device may further include: a second determining unit, configured to acquire, according to a moving posture of a user, orientation information of a VP and/or a ROI on the projection mapping volume, and acquire the position information of the Q speaker devices.

The rendering unit 174 is further configured to adjust the audio data rendered by each of the speaker devices according to the position information of each of the Q speaker devices and the space information of the audio.

Here, in practical applications, the position information of the speaker devices may be corresponding position information on the projection mapping volume, or the position information of the speaker devices may not be corresponding position information on the projection mapping volume. How to adjust the audio data rendered by the speaker devices may be determined by calculation based on the position information of the speaker devices.

It is to be noted that in practical applications, for the N audio acquisition devices correspondingly provided at the deployed position of each of the video acquisition devices, all the units in the data processing device perform the above function on the formed M channels of encoded audio data.

In practical applications, the receiving unit 171, the decoding unit 172, the first determining unit 173, the rendering unit 174, and the second determining unit may be implemented by a processor in the data processing device.

Those skilled in the art should understand that the embodiments of the disclosure may be provided as a method, a system, or a computer program product. So, the disclosure may adopt the forms of a hardware embodiment, a software embodiment, or an embodiment combining software and hardware. Moreover, the disclosure may adopt the form of a computer program product which is implemented on one or more computer available storage media (including, not limited to, a magnetic disk memory or an optical memory) including computer available program codes.

The disclosure is described according to the flowcharts and/or block diagrams of the method, the device (system) and the computer program product in the embodiments of the disclosure. It should be understood that each flow and/or block in the flowchart and/or block diagram, and the combination of the flow and/or block in the flowchart and/or block diagram can be implemented by the computer program instructions. These computer program instructions can be provided to a processor of a general-purpose computer, a special-purpose computer, an embedded processor or other programmable data processing devices to generate a machine, such that instructions which are executed by the processor of the computer or other programmable data processing devices generate a device which is used for implementing the specified functions in one or more flows of the flowchart and/or one or more blocks of the block diagram.

These computer program instructions may also be stored in the computer-readable memory which can guide the computer or other programmable data processing devices to work in a particular way, such that the instructions stored in the computer-readable memory generate a product including an instruction device. The instruction device implements the specified functions in one or more flows of the flowchart and/or one or more blocks of the block diagram.

These computer program instructions may also be loaded on the computer or other programmable data processing devices, such that a series of operation steps are performed on the computer or other programmable data processing devices to generate the processing implemented by the computer, and the instructions executed on the computer or other programmable data processing devices provide the steps for implementing the specified functions in one or more flows of the flowchart and/or one or more blocks of the block diagram.

Based on this, the embodiments of the disclosure further provide a storage medium, specifically a computer-readable storage medium, on which a computer program is stored. When executed by a processor, the computer program performs steps of a data processing method in the above embodiments, or performs steps of another data processing method in the above embodiment.

The above is only the preferred embodiments of the disclosure and not intended to limit the protection scope of the disclosure.

INDUSTRIAL APPLICABILITY

With the solution provided by the embodiments of the disclosure, an acquisition space corresponding to the acquisition apparatus forms a geometry. Spatial positions, at which video acquisition devices of the acquisition apparatus are deployed, cover the whole geometry. N audio acquisition devices are provided at a deployed position of each of the video acquisition devices, where N is a positive integer. The Spatial positions, at which the video acquisition devices and the audio acquisition devices are deployed, cover the whole geometry. In this way, real omnidirectional audio acquisition may be realized. Moreover, for the N audio acquisition devices provided at the deployed position of each of the video acquisition devices, the space information of the audio acquisition devices of the acquisition apparatus is acquired. Audio data acquired by the N audio acquisition devices is encoded according to the space information of the audio acquisition devices to form M channels of audio data. The M channels of audio data carry space information of an audio, where M is a positive integer. After the M channels of encoded audio data are received, the M channels of encoded audio data are decoded to acquire the space information of an audio corresponding to the M channels of audio data. Q speaker devices corresponding to the M channels of audio data are determined according to the acquired space information of the audio and position information of the speaker devices, where Q is a positive integer. The M channels of audio data are rendered with the determined Q speaker devices. N audio acquisition devices are provided at a deployed position of each of the video acquisition devices, and the audio data has the corresponding space information. In this way, immersive audio presentation of the audio data may be performed, and an effect of coordination and synchronization between spatial positions of audios and videos is realized.

The invention claimed is:

1. A data processing method, comprising:
forming, by an acquisition space corresponding to an acquisition apparatus, a geometry and spatial positions covering the whole geometry;
deploying video acquisition devices comprised in the acquisition apparatus at the spatial positions;
providing N audio acquisition devices of the acquisition apparatus at a deployed position of each of the video acquisition devices, wherein N is a positive integer;
acquiring space information of the N audio acquisition devices; and
for the N audio acquisition devices provided at the deployed position of each of the video acquisition devices, encoding audio data acquired by the N audio acquisition devices according to the acquired space information to form M channels of audio data, wherein the M channels of audio data carry the acquired space information and M is a positive integer.

2. The method of claim 1, wherein the space information is at least one of:
physical space information or sound pick-up space information of the N audio acquisition devices,
space information of a central point of spatial positions of the N audio acquisition devices, or
space information of a central point of captured videos.

3. The method of claim 1, wherein the space information is in a form of:
three-dimensional Cartesian coordinates in a three-dimensional coordinate system;
spherical coordinates in a spherical coordinate system; or
orientation information relative to an opposite surface.

4. The method of claim 1, wherein at least one of following applies:
video data acquired by all of the video acquisition devices is restored to a sphere; or
the audio data acquired by all of the N audio acquisition devices is restored to a sphere.

5. The method of claim 1, further comprising:
storing or sending out the M channels of audio data.

6. A data processing device, comprising:
a processor, configured to:
form a geometry and spatial positions covering the whole geometry by an acquisition space corresponding to an acquisition apparatus,
deploy video acquisition devices comprised in the acquisition apparatus at the spatial positions,
provide N audio acquisition devices of the acquisition apparatus at a deployed position of each of the video acquisition devices, wherein N is a positive integer,
acquire space information of the N audio acquisition devices, and
encode, for the N audio acquisition devices provided at the deployed position of each of the video acquisition devices, audio data acquired by the N audio acquisition devices according to the acquired space information to form M channels of audio data, wherein the M channels of audio data carry the acquired space information and M is a positive integer.

7. The device of claim 6, wherein:
the processor is further configured to store or send out the M channels of audio data.

* * * * *